United States Patent [19]

Palazzetti et al.

[11] Patent Number: 5,324,112
[45] Date of Patent: Jun. 28, 1994

[54] DETECTOR DEVICE FOR EVALUATING THE THERMAL COMFORT CONDITIONS IN AN ENVIRONMENT, FOR EXAMPLE, IN THE INTERIOR OF A MOTOR VEHICLE

[75] Inventors: Mario Palazzetti; Gianfranco Salotti, both of Avigliana; Fabio Mingrino, Turin, all of Italy

[73] Assignee: Fiat Auto S.p.A., Turin, Italy

[21] Appl. No.: 920,183

[22] Filed: Jul. 24, 1992

[30] Foreign Application Priority Data

Jul. 31, 1991 [IT] Italy .............................. T091A00614

[51] Int. Cl.⁵ .......................... G01K 3/00; G01K 7/16
[52] U.S. Cl. ..................................... 374/109; 374/185; 236/68 B
[58] Field of Search ............... 374/109, 114, 116, 164, 374/165, 168, 185; 236/68 B, 94; 338/22 R, 26, 210, 212

[56] References Cited

U.S. PATENT DOCUMENTS

| | | | |
|---|---|---|---|
| 2,728,832 | 12/1955 | Hoffman | 374/168 |
| 2,745,944 | 5/1956 | Price | 338/26 |
| 3,271,719 | 9/1966 | Ovshinsky | 338/28 |
| 3,421,375 | 1/1969 | Dimon | 374/168 |
| 3,537,053 | 10/1970 | Snoberger et al. | 338/26 |
| 3,623,545 | 11/1971 | Pinckaers | 236/68 B |
| 3,832,908 | 9/1974 | Usami et al. | 374/164 |
| 3,852,570 | 12/1974 | Tyler | 338/212 |
| 3,861,589 | 1/1975 | Carlson | 236/68 B |
| 3,915,003 | 10/1975 | Adams | 374/164 |
| 4,058,254 | 11/1977 | Hallgreen | 374/109 |
| 4,498,337 | 2/1985 | Gruner | 374/185 |
| 4,565,455 | 1/1986 | Bloore et al. | 374/164 |
| 4,733,541 | 3/1988 | Ismail et al. | 62/186 |
| 4,750,497 | 6/1988 | Suzuki et al. | 374/185 |

FOREIGN PATENT DOCUMENTS

| | | | |
|---|---|---|---|
| 0237228 | 9/1987 | European Pat. Off. | H05B 3/14 |
| 0274077 | 7/1988 | European Pat. Off. | G05D 23/19 |
| 2416457 | 8/1979 | France | G01K 7/16 |
| 8102638 | 9/1981 | World Int. Prop. O. | 374/109 |

OTHER PUBLICATIONS

EPO Search Report for Italian Patent Application No. T091A000614, filed Jul. 31, 1991.

Primary Examiner—William A. Cuchlinski, Jr.
Assistant Examiner—G. Bradley Bennett
Attorney, Agent, or Firm—Fish & Richardson

[57] ABSTRACT

The device comprises a heat-sensitive element which is heated to a controllable extent so as to keep it at a predetermined temperature, for example, average body temperature. Detector means measure the power or energy required to keep the heat-sensitive element at this predetermined temperature, thus providing a signal indicative of the thermal comfort conditions of the environment. The heat-sensitive element has a general elongated shape so that it can be inserted, for example, into a motor vehicle safety belt, ensuring that the indication obtained indicates the general thermal comfort conditions throughout the entire region of the environment in which the heat-sensitive element extends.

12 Claims, 2 Drawing Sheets

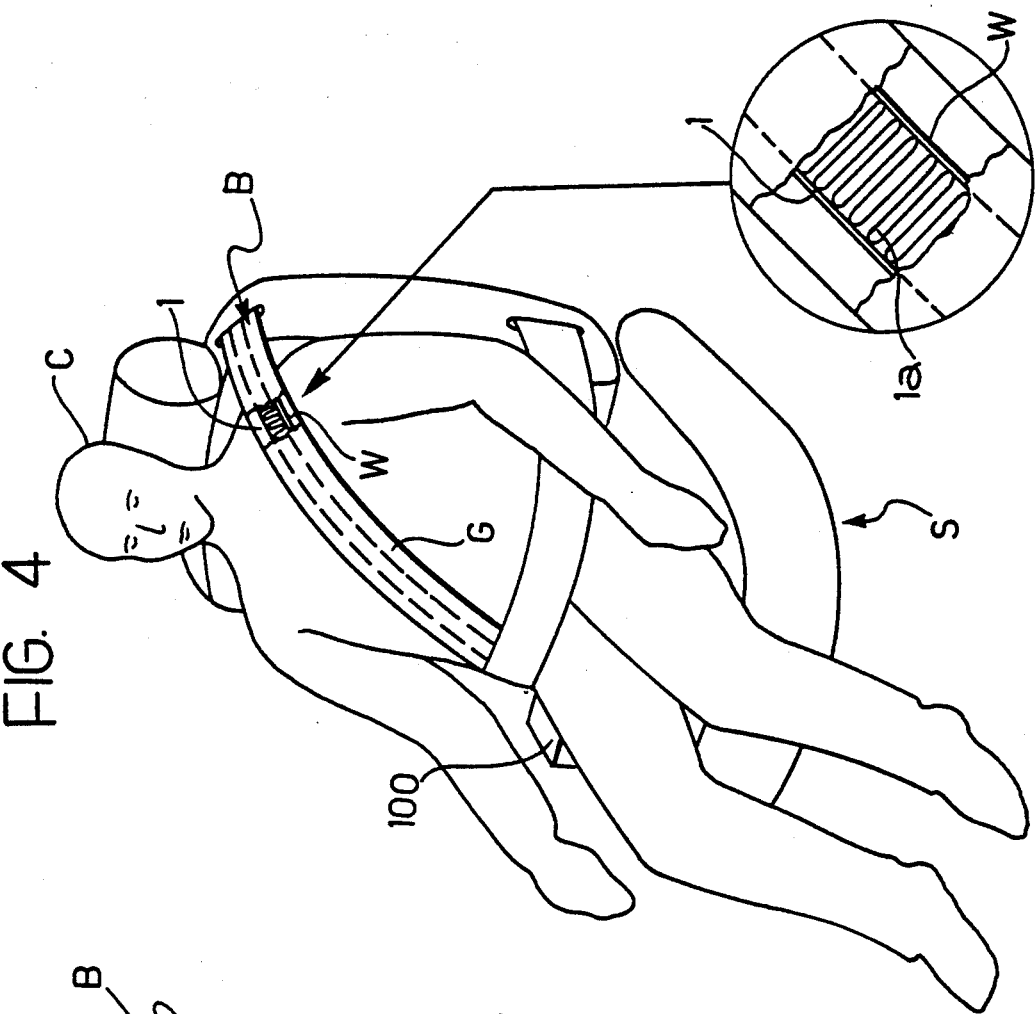
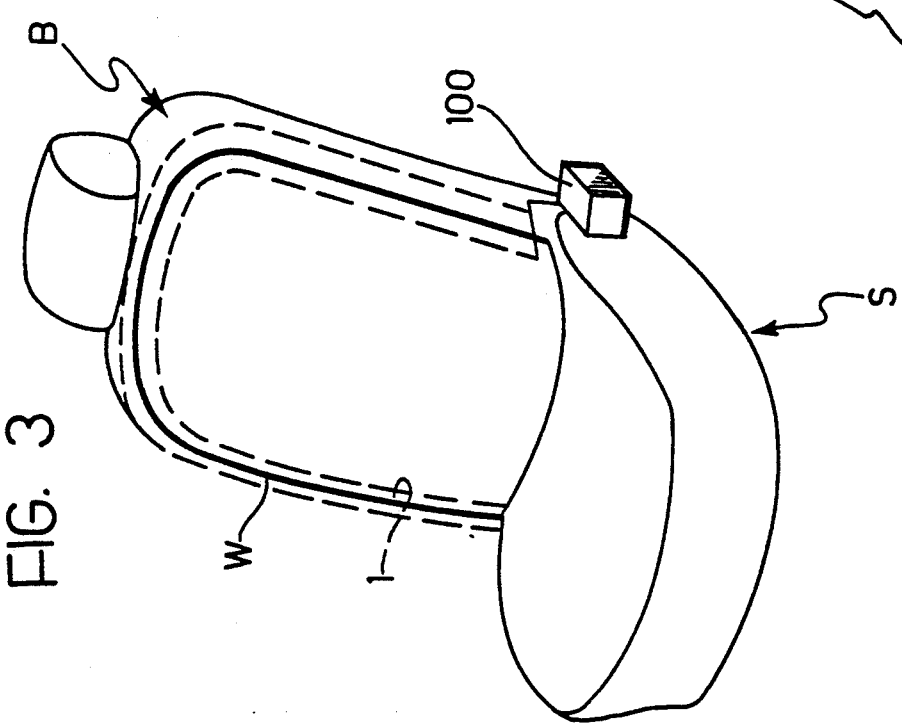

DETECTOR DEVICE FOR EVALUATING THE THERMAL COMFORT CONDITIONS IN AN ENVIRONMENT, FOR EXAMPLE, IN THE INTERIOR OF A MOTOR VEHICLE

This invention relates to a detector device for evaluating the thermal comfort conditions in an environment. The invention has been developed paying particular attention to the possible use of a detector device of this kind for evaluating the thermal comfort conditions in the interior of a motor vehicle, for example, for generating a signal adapted to be used to control the air-conditioning system of the motor vehicle interior.

It is known that the degree of thermal comfort in an environment does not depend exclusively on the air temperature of this environment. It is in fact possible for there still to be a feeling of discomfort, even if the air temperature is satisfactory. On the other hand, in other situations it is possible to experience a feeling of thermal comfort even when the air temperature is relatively low. The feeling of thermal comfort perceived by the human body is in fact determined not only by the air temperature, but also by other factors, such as humidity, air turbulence, thermal radiation conditions, etc.

Prior Italian Patent No. 1 183 980 proposes a device for providing a reliable measurement of the degree of thermal comfort of an environment, taking account of a plurality of factors which may condition the feeling of thermal comfort. In particular, the solution described in this prior patent provides for the use of a heat-sensitive element supplied with heat to a controllable extent by control means which, in this manner, keep the heat-sensitive element at a predetermined temperature, for example, a temperature substantially equal to average body temperature. Detector means therefore make it possible to detect the power or energy required at the said heater means to keep the heat-sensitive element at this predetermined temperature, thereby obtaining an indication of the degree of thermal comfort which takes account of a plurality of factors capable of influencing it, such as temperature, air speed and turbulence and thermal radiation conditions.

In particular, the Applicant has obtained a method of detecting, in a solution such as the one described in the prior patent, that there is a very precise correlation between the electrical power required to keep the heat-sensitive element at the predetermined temperature and the degree of thermal comfort of the environment.

This applies above all in the case of environments subjected to heating or to loss of heat by radiation (for example, heating environments with infrared rays) or in environments in which the rate of humidity has anomalous values, and in specially ventilated environments, as even in this case the feeling of thermal comfort cannot be correlated with the air temperature alone, these all being situations of use encountered in the interior of a motor vehicle, above all taking account of the fact that it is surrounded to a considerable extent by glass surfaces.

This prior patent therefore suggests the use of a certain number of sensor devices arranged at the points at which some of the parts of the body of a motorist (or of a dummy simulating the said motorist), for example, the feet, the head, the hands, etc., will be situated, in order to detect with accuracy whether uniform thermal comfort conditions exist in the interior of the motor vehicle..

In fact, the thermal and thermodynamic conditions that tend to be established in the interior of a motor vehicle (above all during running) are quite different, so that, using the F solution according to prior patent No. 1 183 980, it is in fact necessary to provide a certain number of thermal comfort sensors, this being disadvantageous in terms of simplicity of the system for detecting and processing the relative signals and, consequently, in terms of cost.

Therefore, the object of this invention is to improve the solution described in the above prior patent by providing means capable of effecting overall detection of the thermal comfort conditions in an environment, even in an environment, precisely like the interior of a motor vehicle, in which completely non-uniform conditions often tend to be established.

This problem is solved according to this invention by virtue of a device having the features specified in the following claims. The invention will now be described purely by way of a non-limiting example with reference to the accompanying drawings, in which:

FIGS. 3 and 4 illustrate in a specific manner two particular embodiments of one of the elements that can be seen in FIGS. 1 and 2.

Figure 1:
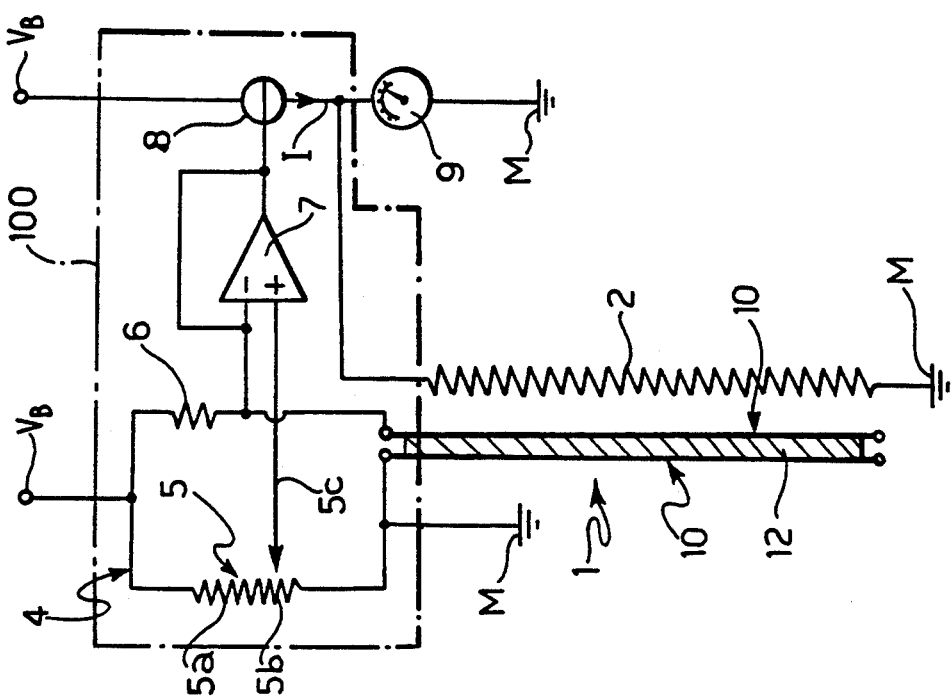
FIG. 1 is a circuit diagram of a first embodiment of the device according to the invention.

With reference to the embodiment of FIG. 1, the device according to the invention comprises two resistors 1 and 2, the first of which has variable resistance as a function of the temperature, while the other has constant resistance. These resistors are thermally coupled to one another, a result which can be achieved, for example, by winding the heat-sensitive resistor 1 on to the heating resistor ("heat exchange means") 2 or vice versa.

Both of the resistors 1 and 2 are of a generally elongated shape and therefore have a general ribbon-like structure, preferably flexible, and have a length, for example, of approximately one meter or more, so that they can be arranged within an environment, typically the interior of a motor vehicle, so that the heat-sensitive resistor 1 extends for a certain distance within the said motor vehicle interior.

For example, with reference to the embodiment of FIG. 3, the resistor 1 forms a type of arch or overturned U extending along a first side, the top and the Second side of the back B of a seat S of a motor vehicle.

On the other hand, in the embodiment referred to by FIG. 4, the resistor 1 is in fact incorporated into one of the straps (for example, the oblique strap G) of the safety belt which encloses the body of a motorist C occupying the seat S.

In both of the solutions illustrated in FIGS. 3 and 4, it would appear to be preferable for the resistor 1 to be sensitive primarily to the ambient conditions, while still being screened from the emission of heat by the body of the person occupying the seat S. This result can be obtained in a simple manner by associating a ribbon-like screening element W with the resistor 1, capable of adapting to the orientation and general flexibility of the resistor 1, made of material having good thermal insulation properties (above all with respect to infrared radiation) and arranged so as to be interposed between the body of the person C occupying the seat S and the said resistive element 1.

With regard to the production of the latter, it is possible to adopt various solutions, both with respect to the selection of the constituent material and with respect to the general arrangement of the said resistor.

The constituent material of the resistor 1 may be, for example, a metal, such as copper or nickel. The selection of a material of this kind is certainly advantageous both for the general characteristics of ductility (allowing the resistor 1 to be produced in the form of a ribbon-like coil having good flexibility characteristics and, possibly, restrained longitudinal extensibility characteristics) and with respect to the strictly intended electrical properties. Nickel would appear to be preferable to copper from this point of view, both for its higher intrinsic resistivity and for its higher coefficient of variation of resistivity with temperature.

As a further alternative, one may consider the use of, for example, conductive plastics materials.

Examining the structure of the resistor illustrated in FIG. 1 in more detail, it will be noted that it consists essentially of two elongated rheophores 10 between which there extends a mass of ribbon-like resistive material 12 (formed, for example, of a ribbon of conductive plastics).

Assuming that the length of the resistor 1 (length L) can be expressed by a standard parameter X included between O and L, the conductance G (that is, the reciprocal of the resistance R) demonstrated completely by the resistor 1 between the two rheophores 10 can be expressed in general according to a relation of the type $$G = \int_O^L g(x, T(x))dx \quad (1)$$

where the factor g(x, T(x)) indicates the conductivity of the infinitesimal element of resistive material 12 which is situated at the length x of the resistor and T expresses in general the dependency of this elementary conductivity on the local temperature of this infinitesimal element, a temperature which, in turn, also depends on the parameter x, since, as can be seen, the thermal and thermodynamic conditions of the environment are generally different from point to point.

Therefore, it follows that the relation 1 expresses a principle on the basis of which the conductance of the resistor 1 incorporates an integration effect (of the conductance value) over the length of the resistive element.

This ensures that the resistor 1 is not sensitive exclusively to a local thermal or thermodynamic condition (as is the case with the sensor of prior U.S. Pat. No. 1,183,980, in practice, punctiform), but, on the other hand, expresses a detecting action of the comfort throughout the entire zone of the environment in which the said resistive element 1 extends.

Returning to the diagram of FIG. 1, it will be noted that the heat-sensitive resistor 1 is connected to a processing circuit 100, which is then inserted accurately in a bridge circuit 4 connected in a power source (for example, a battery of a motor vehicle) which supplies a voltage VB and earth M.

Two sides of the bridge circuit 4 comprise the two portions 5a and 5b of the resistive element of a potentiometer 5, the sliding contact of which is designated by 5c. The other two sides comprise a resistor 6 and the heat-sensitive resistor 1.

A differential amplifier 7 has its inputs connected respectively to the sliding contact 5c of the potentiometer 5 and to the junction of the resistors 1 and 6. The output of the amplifier 7 is connected to the driver input of a driven current generator circuit 8. The heating resistor 2 is interposed between this current generator and earth M. A voltmeter 9..is connected to the ends of this resistor, the scale of which may advantageously be calibrated in watts.

In use, the current generator 8 supplies a current I to the heating resistor 2 which, following thermal dissipation, tends to keep the heat-sensitive resistor 1 at a temperature as close as possible to an identified reference temperature regulating the potentiometer 5. In general, the regulation can be effected by selecting a temperature as close as possible to the average body temperature, since this selection is preferred in many ways in order to detect a condition which is closer to the normal feeling of comfort. If, in the environment in question, the humidity or the air speed in the zone completely occupied by the sensor 1 (thus, with reference to the solutions for assembly illustrated in FIGS. 3 and 4, throughout the entire zone surrounding a seat S or the person occupying a seat within the interior of a motor vehicle) are such that they cause a reduction in temperature of the resistor 1, the consequent variation in the resistance of the said heat-sensitive resistor 1 causes a corresponding variation in the voltage between the inputs of the amplifier 7. The latter supplies a signal to the current generator 8, so as to cause an increase in the current I supplied by the heating resistor 2, so as to oppose the temperature reduction of the heat-sensitive resistor 1, in order to keep it substantially at the temperature defined hereinabove. The voltmeter 9 calibrated in watts supplies in a corresponding manner an indication of the electrical power required to keep the resistor 1 at the predetermined temperature. Instead of the voltmeter 9, it is of course also possible to use a wattmeter or any other device capable of indicating the electrical power absorbed by the resistor 2 in order to effect the thermostatic action described hereinbefore. It is also possible to envisage the association of an integrator device with the voltmeter 9 (or with any equivalent element), capable of providing an indication not only of the electrical power, but also of the electrical energy absorbed over a certain period of time by the resistor 2.

In both cases, the indication of the power or energy absorbed in order to effect the thermostatic action of the resistor forms a good indication of heat "dispersion" phenomena experienced by a person situated in the zone of the environment in which the heat-sensitive resistor 1 extends (for example, along the paths illustrated in FIGS. 3 and 4).

Of course, for use in environments with an air temperature in excess of 36°–37° C., the resistor may advantageously consist of a Peltier effect element.

Figure 2:
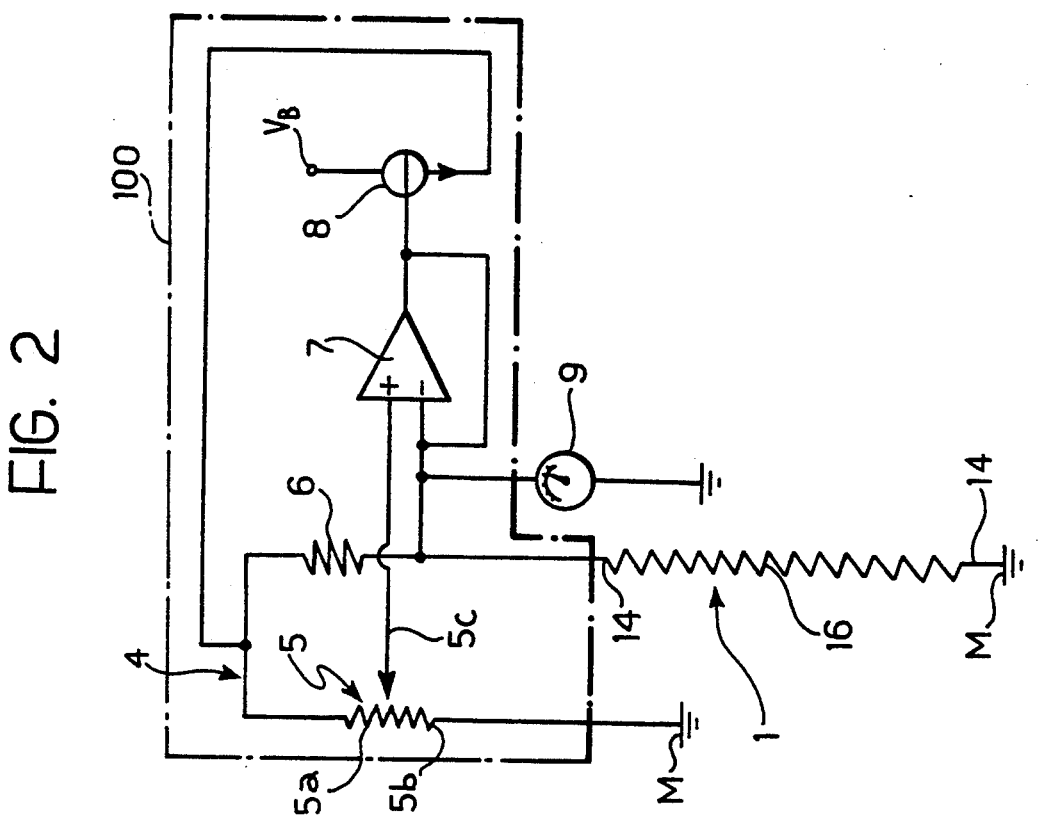
FIG. 2 is the wiring diagram of a variant embodiment of the device according to the invention.

FIG. 2 relates to a variant embodiment of the detector device according to the invention. In this drawing, the elements already described hereinbefore with reference to the embodiment according to FIG. 1 are designated by the same reference numerals.

In essence, the embodiment of FIG. 2 differs from the embodiment of FIG. 1 in two aspects:
  the absence of the heating resistor 2 associated with the heat-sensitive resistor 1, and
  the fact that the said resistor 1 is produced in the form of a resistor comprising two end rheophores 14 between which there extends in the direction of the length of the said resistor 1 a strip or ribbon of resistive material 16.

With reference specifically to the first aspect, it will be noted that the bridge circuit 4 is supplied with the current emitted by the current generator 8. In this case, therefore, instead of being heated by an auxiliary resistor, the heat-sensitive resistor 1 is brought to the temperature by the electric current by which it is traversed, this current being supplied by the current generator 8 in an amount controlled by the amplifier 7 as a function of the voltage detected thereby. The voltmeter 9, again in this case preferably calibrated in watts (or any other device for measuring the power or electrical heating energy absorbed by the resistor 1) is connected to the ends of the said heat-sensitive resistor 1.

In other words, in this case, the resistor 1 acts at the same time as a heat-sensitive element and as a heating element ("heat exchange means") adapted to effect the thermostatic action of the said heat-sensitive element.

However, with respect to the general structure of the resistor 1 of FIG. 2, it will be noted that in this case the resistance R present at the ends thereof may generally be expressed by a relation of the type $$R = \int_O^L r(x, T(x))dx \quad (II)$$

where r(x, T(x)) indicates the resistance of an infinitesimal element of the resistive mass 16 disposed at a distance x from one of the rheophores 14 taken as a point of origin O of the resistor. Here once again, the local resistance varies as a function of the temperature T, which, as a result of the presence of non-uniform thermal and thermodynamic conditions within the environment, also varies with the parameter x.

Consequently, while with reference to the resistor 1 of FIG. 1, mention was made of integrating behaviour with respect to conductance, in the case of the resistor 1 of FIG. 2, it is a question of integrating behaviour with respect to resistance.

In one specific embodiment, the resistor 1 (FIG. 2) is associated with a safety belt in the manner shown in FIG. 4.

In particular, the resistor 1 is produced using copper wire having a diameter of 1/10 mm. The wire is applied by means of stitching to a ribbon support 1a in the form of a coil with loops having an amplitude equal to approximately one centimeter in the region of approximately five loops per centimeter. The coil resistor 1 is produced with a length equal to approximately one meter so that it can be applied by means of stitching of the ribbon support to the oblique strap of a safety belt.

The nominal resistance value of the resistor (at 20° C.) is of the order of a few ohms (typically 3 ohms).

A strip of thermally insulating material consisting of foamed polymethane adapted to form the screening element W is applied to the side of the resistor 1 directed towards the belt (thus towards the body of the motorist) below the ribbon support.

Of course, while adhering to the principle of the invention, the embodiments and the features may be varied considerably with respect to those described and illustrated by way of a non-limiting example, without thereby going beyond the scope of this invention.

We claim:

1. A detector device for evaluating the thermal comfort conditions in a manned environment, comprising:

a heat-sensitive element adapted to be disposed in said manned environment and in thermal contact with said manned environment, heat exchange means adapted to exchange heat to a controllable extent with said heat-sensitive element so as to keep said heat-sensitive element at a predetermined temperature, detector means adapted to detect an amount of power or energy required at said heat exchange means to keep the heat-sensitive element at said predetermined temperature and to generate a signal corresponding to said amount of power or energy, said signal indicating the ambient thermal comfort conditions in said manned environment, characterized in that said heat-sensitive element has a general, elongated, ribbon-like flexible structure, said heat-sensitive element extending over a certain length within and in thermal contact with an extended zone of said manned environment and being associated with screening means adapted to screen said heat-sensitive element from heat generation phenomena in a predetermined zone of said manned environment, said screening means being arranged on a side of a motor vehicle safety belt that is adapted to be directed towards the body of the person using said safety belt, said heat-sensitive element thus being substantially screened from the heat generation from the body of the person, and said signal thus indicating the thermal comfort conditions throughout the entire extended zone in which the heat-sensitive element extends.

2. A detector device for evaluating the thermal comfort conditions in a manned environment, comprising:

a heat-sensitive element adapted to be disposed in said manned environment and in thermal contact with said manned environment, heat exchange means adapted to exchange heat to a controllable extent with said heat-sensitive element so as to keep said heat-sensitive element at a predetermined temperature, detector means adapted to detect an amount of power or energy required of said heat exchange means to keep said heat-sensitive element at said predetermined temperature and to generate a signal corresponding to said amount of power or energy, said signal indicating the ambient thermal comfort conditions in said manned environment, characterized in that said heat-sensitive element is of a generally elongated shape extending over a certain length within and in thermal contact with an extended zone of said manned environment and being associated with a flexible element, said flexible element being a motor vehicle safety belt, said signal thus indicating the thermal comfort conditions throughout the entire extended zone in which the heat-sensitive element extends.

3. A device according to claim 1 or 2, wherein said heat-sensitive element comprises a heat-sensitive resistor comprising a mass of resistive material disposed generally between a first conductor and a second conductor.

4. A device according to claim 3, wherein said mass of resistive material is of elongated shape and said first conductor and said second conductor substantially coincide with said mass of resistive material, the conductance value detected between said first conductor and said second conductor corresponding to an integration effect of the local conductance values along the length of said mass of resistive material.

5. A device according to claim 1 or 2, wherein said mass of resistive material is of elongated shape and disposed between said first conductor and said second conductor, the resistance value detected between said first conductor and said second conductor corresponding to an integration effect of the local resistance values along the length of said mass of resistive material.

6. A device according to claim 1, wherein said heat-sensitive element comprises a resistor having a mass of resistive material selected from the group consisting of copper, nickel and conductive plastics.

7. A device according to claim 1 or 2, wherein:
said heat-sensitive element comprises a resistor having variable resistance as a function of the temperature, and
said heat exchange means comprises
means for supplying an electric current to said resistor, and
circuit means adapted to detect variations in voltage at opposite ends of said resistor and to drive said heat exchange means as a function of said voltage.

8. A device according to claim 1 or 2, wherein:
said heat-sensitive element comprises a heat-sensitive resistor, and
said heat exchange means comprises
a heating resistor thermally coupled to said heat-sensitive resistor, and
a current generator adapted to supply said heating resistor with a current which is variable as a function of voltage drop detected on said heat-sensitive resistor so as to keep said heat-sensitive resistor at said predetermined temperature.

9. A device according to claim 7, wherein said heat exchange means comprises a current generator for supplying said heat-sensitive resistor with a current which is variable as a function of voltage drop at opposite ends of the heat-sensitive resistor, so as to keep said heat-sensitive resistor at said predetermined temperature.

10. A device according to claim 8, wherein said detector means comprise a voltmeter connected to opposite ends of said heating resistor.

11. A device according to claim 9, wherein said detector means comprise a voltmeter connected to opposite ends of said heat-sensitive resistor.

12. A method for controlling the thermal comfort system of a motor-vehicle, comprising:
disposing a temperature-sensitive element in an interior space of said motor vehicle, said temperature-sensitive element being of a generally elongated shape and extending over a predetermined length within said interior space and in thermal contact with the ambient conditions of the interior space;
disposing an elongated heating element in thermal contact with substantially the entire predetermined length of said temperature-sensitive element so as to keep said temperature-sensitive element at a predetermined temperature;
detecting an amount of power or energy consumed by said heating element in keeping said temperature-sensitive element at said predetermined temperature;
generating a signal corresponding to said amount of power or energy, said signal indicating the ambient thermal comfort conditions in a zone through which the temperature-sensitive element extends; and
controlling said thermal comfort system in response to said signal.

* * * * *

UNITED STATES PATENT AND TRADEMARK OFFICE
CERTIFICATE OF CORRECTION

PATENT NO.   : 5,324,112
DATED        : June 28, 1994
INVENTOR(S)  : Mario Palazzetti, et al.

It is certified that error appears in the above-identified patent and that said Letters Patent is hereby corrected as shown below:

On the title page, item [56], under U.S. Patent Documents, insert --4135396--.

Under Foreign Patent Documents insert the followings:

0,360,101  03/1990  European
    0,363,191  11/1990  European
    0,244,501  11/1990  European
    2,168,467  06/11996  Great Britain

UNITED STATES PATENT AND TRADEMARK OFFICE
CERTIFICATE OF CORRECTION

PATENT NO. : 5,324,112

DATED : June 28, 1994

INVENTOR(S) : Mario Palazzetti, et al.

It is certified that error appears in the above-identified patent and that said Letters Patent is hereby corrected as shown below:

Col. 1, line 68, delete the second period at the end of the sentence.

Col. 2, line 4, before "solution", delete "F".

Col. 2, line 49, "Second" should be --second--.

Col. 3, line 51, after "prior", delete "U.S.".

Col. 4, line 5, after "9", delete the two periods.

Col. 4, line 48, after "resistor", insert --1--.

Col. 7, line 3, claim 5, "claim 1 or 2" should be --claim 2--.

Col. 7, line 10, claim 6, "claim 1" should be --claim 1 or 2--.

Signed and Sealed this

Sixteenth Day of April, 1996

BRUCE LEHMAN

*Attest:*

*Attesting Officer*  Commissioner of Patents and Trademarks